POLYMERIZATION PROCESS FOR PREPARING MODIFIED ACRYLONITRILE POLYMERS

Harry W. Coover, Jr., and Donald J. Shields, Kingsport, Tenn., assignors to Eastman Kodak Company, Rochester, N.Y., a corporation of New Jersey Application February 3, 1954, Serial No. 407,954

7 Claims. (Cl. 260—45.5)

This invention relates to a continuous process for the preparation of modified acrylonitrile polymers containing from 5 to 95% by weight of combined acrylonitrile.

In Coover and Dickey, United States Patent No. 2,649,434, dated August 18, 1953, it is shown that valuable polymer products can be obtained by polymerizing acrylonitrile alone in the presence of "live" homopolymers of various unsaturated monomeric compounds, i.e., homopolymers which have not been separated from their polymerization reaction mixtures, the acrylonitrile being added to the mixture and the polymerization continued to the desired extent. In Coover and Dickey, United States Patent No. 2,620,324, dated December 2, 1952, it is shown that still other valuable polymer products can be obtained by polymerizing acrylonitrile alone in the presence of "dead" homopolymers and copolymers of certain unsaturated monomeric compounds, i.e., polymers which have been isolated from their polymerization reaction mixtures prior to polymerization with the acrylonitrile. In Coover and Dickey, United States Patent No. 2,657,191, dated October 27, 1953, it is shown that still other valuable polymer products can be obtained by polymerizing acrylonitrile alone in the presence of "live" interpolymers of certain unsaturated monomeric compounds. In Coover and Caldwell application Serial No. 408,013, filed of even date herewith, it is shown that still other valuable polymer products can be obtained by copolymerizing acrylonitrile and at least one other polymerizable monomer in the presence of certain "dead" homopolymers and interpolymers. In Coover application Serial No. 408,011, filed of even date herewith, it is shown that still other valuable polymer products can be obtained by copolymerizing acrylonitrile and at least one other polymerizable monomer in the presence of certain "live" homopolymers. In Coover application Serial No. 408,012, filed of even date herewith, now U.S. Patent No. 2,838,470, it is shown that still other valuable polymer products can be obtained by copolymerizing acrylonitrile and at least one other polymerizable monomer in the presence of certain "live" interpolymers.

Modified acrylonitrile polymers of the above described kind are termed "graft" copolymers and can be dissolved in common acrylonitrile polymer solvents such as N,N-dimethylformamide, N,N-dimethylacetamide, ethylene carbonate, ethylene carbamate, γ-butyrolactone, N-methyl-2-pyrolidone, and the like, to give filterable, smooth dopes which can be spun by wet or dry spinning methods to fibers having greatly improved moisture absorption and dyeability. Such fibers have, in addition, all the desirable physical properties exhibited by fibers produced from straight polyacrylonitrile.

However, all of the above mentioned polymers have been prepared by discontinuous or batch-type processes. In addition to the inherent disadvantages of these batch processes with regard to equipment, manpower, etc., there are a number of important chemical difficulties which have been encountered in the batch polymerization of the compositions described above. Polymerizations carried out in batch-type reactors, and in particular free radical catalyzed polymerizations involving acrylonitrile, usually exhibit an "induction period"—a period of time between the initial combination of reagents and the first evidence of polymer formation. The nature or the causes of this induction period are not completely understood. Presumably, it is related to the inhibitory effects of oxygen and the extreme difficulty of completely or reproducibly removing all traces of oxygen from batch-type equipment, which, of necessity, contains a certain amount of free space. The induction period exhibited in these batch-type processes, we have found, appears to vary, even under very carefully controlled conditions, and has a pronounced effect on the rate of polymerization of acrylonitrile. The rate of polymerization affects the molecular weight distribution of the product, and this in turn affects the solubility and physical properties of the polymer. Thus, the reproducibility of polymerization in the above described batch-type processes is not satisfactory, either in terms of the time required to carry polymerizations to the same conversions or in the control of polymer inherent viscosity and related properties.

Another disadvantage of these batch-type processes is related to the heat which must be dissipated during the course of the polymerization reaction. Since the total amount of all the ingredients is present when the reaction starts, rapid reactions evolve a tremendous quantity of heat in very short periods of time. Even with very efficient cooling, it is almost impossible to dissipate this heat and thus hold a constant temperature in a large batch reactor as required for commercial production. This in turn imposes a limit on the rapidity with which the batch polymerizations can be carried out. Since many of the most useful graft polymerizations involve the use of amide modifiers which exhibit an "inverse" solubility in water, i.e. modifiers which decrease in solubility as the temperature of the water solution increases, this lack of temperature control introduces another disadvantageous variable. Most graft polymerizations with the amide modifiers must be carried out just below the temperature at which the amide modifiers become insoluble. This is especially necessary with the acrylamide type of modifiers. If, as in a batch process, temperature control is inadequate, the precipitation temperature of the copolymer is sometimes exceeded and discrete particles of the unreacted original copolymer form and persist in the product. Accordingly, a nonhomogeneous composition distribution among the particles of product polymer results, and the properties of such graft polymers tend to approach those of a mechanical mixture. This type of broad composition distribution which relates to polymer particles is peculiar to graft-type copolymers of the above described processes wherein amide polymer modifiers which exhibit an "inverse" solubility are employed.

A more common type of broad composition distribution occurs when, in a batch process, two vinyl monomers of different reactivities are copolymerized. The first polymer formed tends to be relatively rich in the more reactive monomer, whereas the later polymer formed tends to be relatively rich in the less reactive monomer. This leads to a product, the molecules of which differ appreciably in composition. This effect is particularly disadvantageous when it is desired to include a minor proportion of some monomer modifier in the so-called "backbone" of the above described kind of graft copolymers.

Another disadvantage of the batch process, in which all the ingredients are added at the beginning of the polymerization, can be interpreted in terms of molecular weight distribution. At the beginning of the reaction, the various ingredients exist in certain relative ratios to each other. The instantaneous molecular weight of the polymer formed depends almost entirely upon these relative concentrations of monomer and catalyst, activator, regulator, acid, etc. As polymer forms, the concentration of the several ingredients changes, certain materials disappearing from solution faster than others, some of them by interactions exclusive of monomer. Thus, the relative ratio of the various ingredients to each other, and especially to unreacted monomer, changes and the instantaneous molecular weight of the polymer formed differs from that formed earlier and from that formed later. It follows that such polymers, on the average, tend to have rather broad molecular distributions. This kind of disadvantage, we have found, also to be present in the above described graft copolymers batch processes and products prepared thereby.

It is, accordingly, an object of our invention to provide continuous polymerization processes, which avoid all the above mentioned disadvantages, for preparing graft copolymers of the kind described in the above mentioned batch processes, especially graft copolymers prepared with amide modifier polymers other than unsubstituted polyacrylamide and polymethacrylamide. Another object is to provide continuous polymermization processes which give such graft copolymers of particular utility for fiber-making purposes. Other objects will become apparent by consideration of the following description and examples.

In accordance with our invention, our continuous processes fall into two main groups: (1) those which are used in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). These processes, separately or in combination, tend to minimize or eliminate many of the objectionable features of the batch processes above described. The continuous process (1) is preferred. Preferably, the continuous processes of the invention are carried out in an aqueous medium. However, it is also advantageous in some cases to employ other reaction media such as organic solvents, for example, mixtures of water and a water-soluble solvent such as acetone, anhydrous solvents such as acetonitrile, benzene, toluene, etc., liquid alkanes such as n-heptane, etc., aliphatic ethers, acetone, etc. The term dispersion as used herein is intended to include both true solutions and emulsions. The continuous processes of our invention are especially advantageous for preparing those of our modified acrylonitrile polymers which contain from 60 to 95% by weight of combined acrylonitrile.

The polymerizations are accelerated by heat, by actinic light such as ultraviolet light and polymerization catalysts. Such catalysts are commonly used in the art of polymerization, and our invention is not to be limited to any particular catalyst material. Catalysts which have been found to be especially useful comprise the peroxide polymerization catalysts such as the organic peroxides e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates etc., hydrogen perovide, perborates e.g. alkali metal perborates such as sodium and potassium perborates, ammonium perborate, etc., persulfates e.g. alkali metal persulfates such as sodium and potassium persulfates, ammonium persulfate, etc. Other catalysts such as ketazines, azines, etc. can also be used. Mixtures of catalysts can be employed. The amount of catalyst can be varied depending on the monomer, amount of diluent, etc. The temperatures at which the continuous polymerizations can be carried out can vary from ordinary room temperature to the reflux temperature of the polymerization reaction mixture. Generally, however, a temperature of from 25° to 75° C. is efficacious.

If desired, emulsifying agents can be added to the reaction mixture to distribute uniformly the reactants throughout the reaction medium. Typical emulsifying agents include the alkali metal salts of certain alkyl acid sulfates e.g. sodium lauryl sulfate, alkali metal salts of aromatic sulfonic acids such as sodium isobutyl naphthalenesulfonate, alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers e.g. aryloxy polyalkylene ether sulfonates such as Triton 720, etc. The polymerizations can advantageously be carried out also in the presence of chain regulators such as hexyl, octyl, lauryl, dodecyl, myristyl mercaptans, etc., which impart solubility properties to the polymer composition. If desired, an activating agent such as an alkali metal sulfite e.g. sodium, potassium, etc. sulfites, bisulfites and metabisulfites can be added in about the same amount as the polymerization catalyst.

In the accompanying illustrative drawings.

Figure 1:
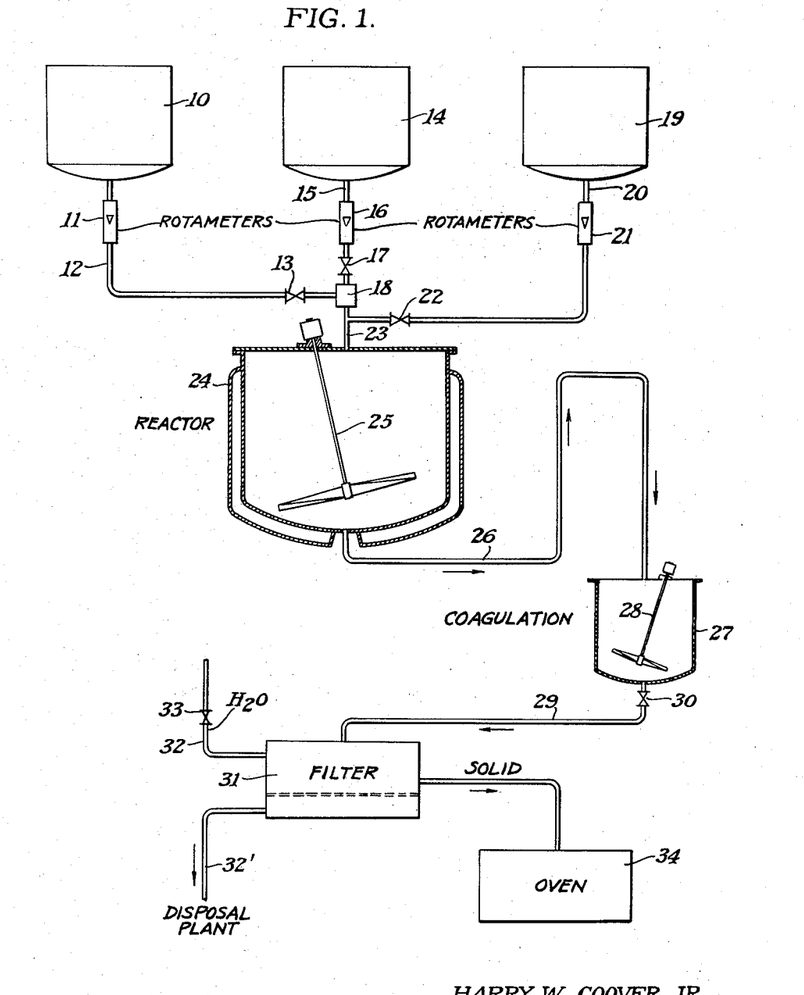
Figs. 1, 2 and 3 show diagrammatically in flow sheet form means for carrying out continuous polymerization processes according to our invention.

Referring to Fig. 1, which shows one form of the preferred continuous process designated (1) above, acrylonitrile, or mixture of acrylonitrile and one or more other polymerization monomers having a —CH=C< group, but preferably a single $CH_2$=C< group, such as an acrylamide or N-alkyl substituted acrylamide or methacrylamide, etc., containing a chain regulator such as an alkyl mercaptan is stored under nitrogen in a storage or supply vessel 10 and is drawn off through a line 12, a rotameter 11 and a valve 13 which regulate the flow to a mixing chamber 18, where the acrylonitrile solution is intimately mixed with a solution of the performed polymer in air-free deionized water, together with the polymerization catalyst and the acid, from a storage or supply vessel 14 where it is stored under nitrogen and drawn off continuously in regulated amount by means of a line 15, a rotameter 16 and a valve 17. The mixture from the mixing chamber is then introduced into a jacketed reactor 24 which is equipped with a means for agitation 25. The activator solution e.g. potassium metabisulfite in air-free deionized water, is stored in a vessel 19, under nitrogen, and is drawn off continuously in regulated amount by means of a line 20, a rotameter 21 and a valve 22, to line 23 where it mixes with the mixed solutions from the storage vessels 10 and 14, and enters the reactor 24. The polymer emulsion or slurry which forms on passage of the introduced ingredients through the reactor is drawn off continuously, at the same rate as the ingredients are added, through a line 26, which is shaped in the form of a leg designed to maintain the liquid level in the reactor at the desired level, to a coagulation vessel 27 equipped with means 28 for agitation where the emulsion is coagulated to discrete particles. The coagulated polymer slurry is continuously drawn off through a line 29 and valve 30 at the same rate as the uncoagulated polymer emulsion is introduced, and enters a filter 31 where the polymer is continuously separated, washed with water introduced through a line 32 and a valve 33, and continuously transferred to an oven 34 where it is dried. The filtrate and washings are drawn off continuously from the filter through a line 32' to a suitable recovery, or disposal plant (not shown).

While the foregoing has described execution of the continuous process with certain equipment, it will be understood that the invention can be effected with some modifications. For example, the activator solution can be introduced directly into the reactor without being admixed with the monomer and polymer mixed solution. Also the number of storage vessels can be varied and the rotameters can be replaced by metering pumps. The agitator in the reactor may or may not be present, and a jacket on the reactor may or may not be necessary as cooling and heating coils may be used instead. The reactor itself may consist of a kettle, or it may consist of a length or coil of pipe surrounded by a gaseous or liquid medium of regulated temperatures, or other suitable arrangement. Under certain conditions, the coagulation tank may be eliminated, the filter replaced by a continuous centrifuge, etc.

Figure 2:
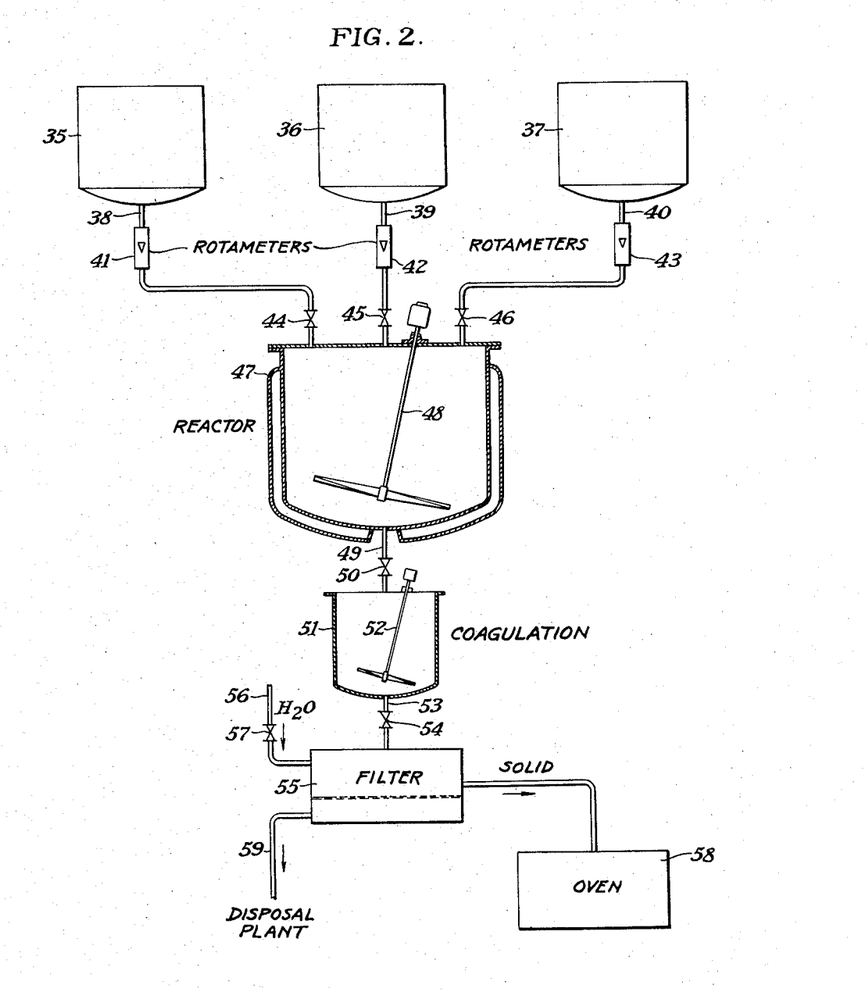

Referring to Fig. 2, which shows one form of the continuous batch process designated (2) above, the storage vessels 35, 36 and 37 contain singly or in appropriate combinations the starting ingredients to be polymerized. One or more of these ingredients in liquid or solution forms as previously described are added continuously from the storage vessels in regulated amounts by means of lines 38, 39 and 40, rotameters 41, 42 and 43 and valves 44, 45, and 46 to a reactor kettle 47 which is jacketed to permit the circulation of cooling or heating liquids or gases and equipped with an agitation means 48. After all the ingredients have been added and the polymerization reaction is completed, the emulsion or slurry of the polymer obtained is drawn off as a unit batch through a line 49 and a valve 50 to a coagulation vessel 51 equipped with an agitation means 52 where the polymer is treated to break up the emulsion and form discrete and filterable particles. The slurry is then drawn off through a line 53 and a valve 54 into a filter 55, where the polymer is separated from the liquid, washed with water supplied by a line 56 and a valve 57 and transferred to an oven 58 where it is dried. The filtrate and washings from the filter are removed by line 59 to a suitable recovery or disposal plant (not shown). The usual practice in the above process is to place one or more of the ingredients in the reactor and then add continuously the required remaining ingredients through the appropriate lines.

In the above described continuous process, it will be understood that it is also within the scope of the invention to recirculate part or all of the polymerization reaction mixture through the reaction system which may comprise one or more reactors in series.

Figure 3:
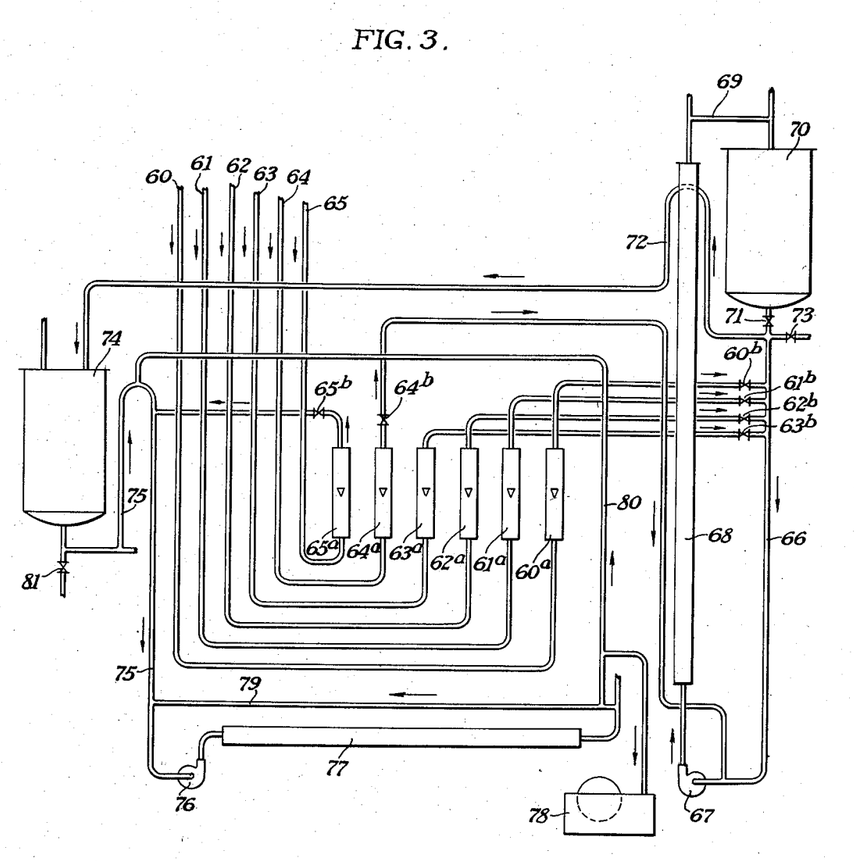

Referring to Fig. 3, which shows another form of the continuous process designated (1) above, dispersions or solutions of acrylonitrile or acrylonitrile admixed with one or more other polymerizable monomers having a —CH=C< group, but preferably a single $CH_2=C<$, for example, an amide such as acrylamide, an N-alkyl methacrylamide wherein the alkyl group contains from 1 to 4 carbon atoms, etc., of the preferred polymer, of the polymerization catalyst, of the alkyl mercaptan regulator, of the alkali metal sulfite, bisulfite, metabisulfite, etc. activator and of one of the known short stop compounds for "killing" the polymerization reaction are introduced into the polymerization reaction system from storage or supply vessels (not shown) through an appropriate metering arrangement (not shown) and then through lines 60, 61, 62, 63 and 64, which are provided with rotameters 60a, 61a, 62a, 63a and 64a, and which are further provided with valves 60b, 61b, 62b, 63b and 64b, into a line 66 which is part of a recirculating system comprising the line 66, a recirculating pump 67, a heat exchanger 68, a connecting pipe 69, a first stage reactor vessel 70 and a valve 71. While it is possible to introduce the dispersions or solutions of the ingredients into line 66 in any order, preferably the order of addition going from the top of the reactor vessel 70 toward the recirculating pump 67 is (1) polymer solution through line 60, (2) acrylonitrile or mixture thereof with a different monomer or monomers through line 61, (3) polymerization catalyst through line 62 and (4) chain regulator such as alkyl mercaptan through line 63. The sulfite activator is preferably added through line 64 into line 66 near the recirculating pump 67. Other ingredients which may also be employed in conjunction with mentioned principal ingredients can be combined with one or other of the mentioned solutions or they can be introduced through additional lines. The polymerized dispersion is bled off by gravity flow from line 66, at about the same rate as new ingredients are introduced into the system, by means of a line 72 connected thereto and containing an inverted U which is vented to the top of the reactor vessel 70 to control the level and holding time in the said reactor, the dispersion then entering a second stage reactor vessel 74 located at a lower level, where the polymerization of the bled off dispersion is continued. A draw off valve 73 is located on line 72. The reacted dispersion in reactor vessel 74 is withdrawn by gravity flow by means of a line 75, which also contains an inverted U vented back to the top of the reactor 74 to control level and flow of dispersion, into a recirculating pump 76 and a heat exchanger 77, which delivers the overflow of polymerized dispersion to a continuous filter 78 where the modified acrylonitrile polymer is recovered in the form of a cake and the liquid goes to a vacuum receiver. A line 65 provided with a rotameter 65a and valve 65b is connected to line 75 and functions for the purpose of adding a short stop or "kill" to the polymerized dispersion coming from the second stage reactor 74. A line 80 connects with the circulating system comprising line 75, recirculating pump 76 and heat exchanger 77. A line 79 serves as a bypass between the discharge end of the heat exchanger 77 and the intake of recirculating pump 76. A draw off valve 81 is located on line 75. The filtrate from filter 78 can be treated to recover unreacted ingredients and byproducts or re-used after suitable adjustment. Both of the reactor vessels 70 and 74 are operated under a nitrogen atmosphere. They are equipped with jackets for the circulation of constant temperature water, the water first entering heat exchanger 68, then passing through the jacket of the first stage reactor vessel and finally through the jacket of the second stage reactor vessel.

Although the foregoing has described execution of the continuous process of our invention according to apparatus shown in Fig. 3, it will be understood that the process is operable not only with two reactor vessels as shown, but is operable also with a single reactor vessel or with three, four or five more reactor vessels connected in series or in parallel, and similarly equipped with jackets, heat exchangers, recirculating pumps, connecting lines, etc. Discontinuous filters can also be used. While gravity flow is shown to be advantageous for drawing off polymerized dispersion in any stage, it is also possible to have reactor vessels at a common level and employ suitable pumps for transfer of dispersion. Ordinarily, the various ingredients to be introduced into the polymerization reaction system are stored at about 15° C. and enter the system at about this temperature. However, temperatures of 25° C. and even higher are also feasible for the solutions to be introduced.

The following examples will serve to illustrate in further detail the manner in which we practice our invention.

*Example 1*

100 parts by weight of acrylonitrile containing 1.0 parts by weight of tertiary dodecyl mercaptan were placed in a storage or supply vessel 10 (similar to that shown in the accompanying drawing Fig. 1) under an atmosphere of nitrogen. 20 parts by weight of air-free deionized water containing 2.0 parts by weight of potassium metabisulfite were placed in storage vessel 19 under nitrogen. A mixture comprising 980 parts by weight of air-free deionized water, 5.0 parts by weight of 100% phosphoric acid, 1.0 part by weight of potassium persulfate and 35 parts by weight of a "live" copolymer, i.e. a copolymer which has not been separated from its polymerization reaction mixture, consisting of 70% by weight of N-methylmethacrylamide and 30% by weight of acrylonitrile was placed in storage vessel 14 under nitrogen. The materials from the three storage vessels were then added continuously to the reactor 24 at such relative rates that the relative ratios by weight of materials entering the reactor from storage vessels 10, 14 and 19 were 1.0, 10.1 and 0.218 or (4.58, 46.4 and 1.0), respectively. The materials or reactants from storage tanks 10 and 14 (i.e. the acrylonitrile and tertiary dodecyl mercaptan, and the phosphoric acid, amide copolymer, persulfate catalyst and most of the water) were first intimately mixed at 25° C. immediately before the materials from storage vessel 19 (i. e. the potassium metabisulfite activator and the rest of the water) were added, these latter materials being added immediately before the mixture was introduced into the reactor, which was held at a temperature of approximately 35° C. The polymerization reaction ensued almost immediately. The length of time between the addition of ingredients or reactants to the reactor and the removal of polymer from the same ingredients was defined as the contact time. At equilibrium, the polymer emulsion or slurry was removed from the reactor at the same total rate as the starting ingredients from the storage vessels were added. Thus, the contact time in the reactor was conveniently controlled by the absolute rate of addition of the reactants. The contact time in Example 1 was 2 hours. However, this time can be varied as desired, an especially useful period being between about 30 minutes and 3 hours at the specified temperature of 35° C. The polymer obtained had a softening above 200° C., was soluble in acrylonitrile polymer solvents such as N,N-dimethylformamide, N,N-dimethylacetamide, ethylene carbonate, gamma-butyrolactone, and the like, giving smooth, filterable dopes which were readily spun into fibers having good physical properties and excellent affinity for commercial dyestuffs. The polymer was found to be useful also for the preparation of film supports for photographic arts.

While the polymerization in the above example can be carried out to any degree of conversion, advantageously it is carried out to where from 70% to substantially 100% of the acrylonitrile has been converted to the modified polymer.

In place of the "live" copolymer in the above example, there can be substituted a like amount of the same copolymer, but in this case a so-called "dead" copolymer, i.e. the copolymer is first isolated from its polymerization reaction mixture before being used in the continuous process of our invention. The polymer product resulting is also a graft-type copolymer highly suitable for fiber-forming purpose, but is inferior in many respects to graft copolymers produced with the "live" copolymer.

If it is desired to copolymerize one or more other monomers with the acrylonitrile so that so-called "backbone" modification ensues, i.e. the acrylonitrile is the backbone or major constituent is also possible to mix the additional monomer or monomers in combination with one or more of the other ingredients or reactants. Such backbone modified acrylonitrile polymers are especially useful for fiber-forming purposes where the final modified polymer contains a total of from 60 to 95% by weight of combined acrylonitrile. The following example illustrates this kind of polymer product.

*Example 2*

A "backbone" modified acrylonitrile graft copolymer was prepared by the continuous process of Example 1, except that storage vessel 10 was charged with a mixture in the ratio of 100 parts by weight of acrylonitrile, 5.6 parts by weight of a 30% solution of N-methylmethacrylamide in water and 1 part by weight of tertiary dodecyl mercaptan, storage vessel 14 was charged with a mixture comprising in the ratio of 307 parts by weight of a 10% solution of a "live" copolymer in its original polymerization reaction mixture and containing 70% by weight of N-methylmethacrylamide and 30% by weight of acrylonitrile, 5.8 parts by weight of 85% phosphoric acid, 1 part by weight of potassium persulfate and 1140 parts by weight of water, and storage vessel 19 was charged with a mixture in the ratio of 2 parts by weight of potassium metabisulfite and 20 parts by weight of water. The mixtures or solutions from storage tanks 10, 14 and 19 were then continuously mixed and introduced into the reactor vessel as in Example 1 at such relative rates that the relative ratios by weight of materials entering the reactor from these storage vessels were approximately 1.0, 10.1 and 0.218, respectively. The remainder of the process followed the procedure of Example 1. The conversion of the monomers to the "backbone" modified polymer was approximately 96% by weight. The water used in each case was air-free and deionized. The "backbone" modified graft copolymer obtained had a softening point above 200° C., was highly compatible with polyacrylonitrile and with other acrylonitrile polymers, and showed improved solubility in acrylonitrile solvents such as N,N-dimethylformamide, N,N-dimethylacetamide, ethylene carbonate, gamma-butyrolactone, and the like. It was found possible to prepare solutions or dopes of the polymer product to contain from 25–40 percent polymer solid, such solutions remaining clear colorless, flowable and filterable without any gelling at temperatures below 100° C., in contrast to hitherto known high solids arcrylonitrile polymer dopes which still exhibit gelling effects at temperatures substantially above 100° C. and result in discolored dopes and discolored articles therefrom e.g. fibers and yarns. The polymer product of the above example was found also to give fibers having good moisture absorption and excellent dyeability by commercial dyes. Such fibers were more readily drafted and exhibited greatly improved extensibility for any given tenacity, i.e. in the range of 40–50 percent. The polymer product was also found to be useful for the preparation of film support for photographic purposes.

In place of the "live" copolymer in the above example, there can be substituted a like amount of the same copolymer, but in this case a so-called "dead" copolymer, i.e. the copolymer is first isolated from its polymerization reaction mixture before being used in the continuous process of our invention. The polymer product resulting is also a graft-type copolymer highly suitable for fiberforming purposes, but is less durable in many respects to graft copolymers produced with the "live" copolymer.

*Example 3*

The same equipment was employed in this example as described in Example 1. The procedure was as follows:

100 parts by weight of acrylonitrile containing 1.0 part by weight of tertiary dodecylmercaptan was placed into storage vessel 10 under nitrogen. 20 parts by weight of air-free deionized water containing 2.0 parts by weight of potassium metabisulfite were placed in storage vessel 19 under nitrogen. A mixture of 665 parts by weight of air-free deionized water, 5.0 parts by weight of 100% phosphoric acid, 1.0 part by weight of potassium persulfate and 350 parts by weight of a 10% solution of a 70% N-methyl methacrylamide-30% acrylonitrile copolymer in its aqueous polymerization reaction mixture, the polymerization of which had been stopped at 70% conversion so that remaining unconverted monomers were still present, was placed in storage vessel 14 under nitrogen. The materials from the storage vessels were added continuously to reactor vessel 24 at such relative rates that the relative ratios by weight of materials entering the reactor from vessels 10, 14, and 19 were 1.0, 10.1 and 0.218 (or 4.58, 46.4 and 1.0), respectively. The resulting modified polymer in the preferred process, the materials from storage vessels 10 and 14 (i.e. the acrylonitrile and tertiary dodecyl mercaptan and the phosphoric acid, amide copolymer, persulfate catalyst, and most of the water) were intimately mixed at 25° C. immediately before the materials from storage vessel 19 (i.e. the bisulfite activator and the rest of the water) were added, these latter materials being added immediately before the mixture was introduced into the reactor, which was held at 35° C. Polymerization ensued almost immediately. The polymer slurry was isolated after a contact time of 50 minutes, at which time titration for unreacted monomers indicated that the reaction had gone to 70% conversion of monomers to the modified polymer. The polymerization was then stopped and the resulting modified acrylonitrile polymer was isolated. It was soluble in various solvents including N,N - dimethylacetamide, N,N - dimethylformamide, ethylene carbonate, gamma-butyrolactone, and the like, giving smooth, filterable dopes which were readily spinnable by wet or dry spinning methods to fibers and yarns having good physical properties and excellent affinity for commercial dyestuffs. The polymer was also found to be a valuable material for preparation of photographic film support.

*Example 4*

The ingredients of Example 1 were reacted by the continuous batch process (2) illustrated by Fig. 2, in a number of different ways or combinations including the following:

(a) The catalyst, activator, acid component, amide modifier, water, etc. are placed in the reaction vessel, and the monomer or mixture of monomers and regulator are added continuously.

(b) The monomer or mixture of monomers, regulator, catalyst, acid component, amide modifier, water, etc. are placed in the reaction vessel, and the activator is added continuously.

(c) The monomer of mixture of monomers, regulator, activator, acid component, amide modifier, water, etc., are placed in the reaction vessel, and the catalyst is added continuously.

(d) The monomer or mixture of monomers, regulator, acid component, amide modifier, water, etc., are placed in the reaction vessel and both catalyst and activator, combined or separate, are added continuously.

(e) The amide modifier, catalyst, acid component and water are placed in the reaction vessel, and the monomer or mixture of monomers, and activator, combined or separate, are added continuously.

(f) Processes similar to (a) through (e), except that the acid component is eliminated.

(g) Processes similar to (a) through (b), except that the activator is eliminated.

It will be understood that the above description of the continuous batch process (2) can be varied as to the number of storage vessels used and the rotameters can be replaced by metering pumps. The agitator in the reactor may or may not be present, and the jacket on the reactor may be replaced with heating or cooling coils. Under certain conditions, the coagulation vessel may be eliminated because of obtaining the final polymer product in filterable form, the filter itself replaced by a batch or continuous type centrifuges. The reactor for this process usually consists of a kettle.

Certain advantages derive from the use of the "continuous" process of our invention illustrated by above Examples 1 and 2. For example, there is no free space in the system and all traces of oxygen can be completely eliminated. Therefore, the induction period and thus the non-reproducibility of rate of reaction, polymer inherent viscosity, polymer molecular weight distribution, etc., can be eliminated. Again, in our continuous process, only a relatively small quantity of monomer is polymerizing at any time; therefore, the heat of reaction can be readily dissipated, faster rates can be used, and the temperature can be controlled reproducibly within such narrow limits that no possibility of variable reaction rates or of the precipitation of "inversely" (i.e. solubility decreasing with heat) soluble amide modifiers exists. Thus, "graft" copolymers having a uniform composition distribution of particles are obtained from our continuous process. It follows, also, that the improved temperature control attainable in our continuous process gives more narrow average polymer molecular weight distributions because the molecular weight distribution is affected by variations in rate, which in turn are affected by fluctuations in temperature.

There is also another reason why our continuous process leads to products having improved molecular weight distributions. It was previously mentioned that fluctuations in relative ratios of ingredients are to be expeced in straight batch processes; this fluctuation leads to broad molecular weight distributions. In both our "continuous" (1) and "continuous batch" processes (2), in which reactants are added to the polymerization over a period of time, the relative ratios of the reactants to each other are essentially constant. Thus, the instantaneous molecular weight of the polymer formed at any given time will be about the same as that formed at any other time, and a much more narrow distribution can be obtained than is the case with straight batch processes.

By proceeding as set forth in the preceeding description and examples, other modified graft-type acrylonitrile copolymers having different composition ranges, as well as other components, can also be readily obtained by the processes of our invention. Suitable preformed polymers which can be polymerized with acrylonitrile alone or with acrylonitrile plus other monomers in our continuous process are homopolymers other than unsubstituted polyacrylamide and polymethacrylamide and copolymers of any acrylamides, maleamides, fumaramides, itaconamides, citraconamides, maleamates, fumaramates, itaconamates, citraconamates, acrylates, and vinyl carboxylic esters containing only one ethylenic unsaturation, but preferably those set forth in the following Formulas I to XIII.

The acrylamides whose polymers other than unsubstituted polyacrylamide and polymethacrylamide can be advantageously used in our invention contain from 3 to 12 carbon atoms and comprise those represented by the following general formula:

(I)

wherein R and $R_1$ each represents a hydrogen atom or alkyl group containing from 1 to 4 carbon atoms (e.g. methyl, ethyl, propyl, isopropyl, butyl, isobutyl, etc. groups) and $R_3$ represents a hydrogen atom or a methyl group. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-diethyl acrylamide, N,N-dimethyl methacrylamide, etc.

As maleamides, we can advantageously use those containing from 4 to 20 carbon atoms represented by the following general formula:

(II)

wherein R and $R_1$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, we can advantageously use those containing from 4 to 20 carbon atoms represented by the following general formula:

(III)

wherein R and R₁ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,N'-tetraethyl fumaramide, N,N-dimethyl-N',N'-diethyl fumaramide, etc.

As itaconamides, we can advantageously use those containing from 5 to 21 carbon atoms represented by the following general formula:

(IV)

wherein R and R₁ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides, we can advantageously use those containing from 5 to 21 carbon atoms represented by the following general formula:

(V)

wherein R and R₁ are as above defined. Typical citraconamides include citraconamide, N-methyl citraconamide, N-ethyl citraconamide N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers we can advantageously use comprise those containing from 5 to 16 carbon atoms represented by the following general formula:

(VI)

wherein R and R₁ are as above defined and R₂ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those containing from 5 to 16 carbon atoms represented by the following general formula:

(VII)

wherein R, R₁ and R₂ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those containing from 6 to 17 carbon atoms represented by the following general formulas:

(VIII)

and

(IX)

wherein R, R₁ and R₂ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, we can advantageously use those containing from 6 to 17 carbon atoms represented by the following general formulas:

(X)

and (XI)

wherein R, R₁ and R₂ are as above defined. Typical citroconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers we can advantageously use comprise those containing from 4 to 8 carbon atoms represented by the following general formula:

(XII)

wherein R₂ and R₃ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters we can advantageously use those containing from 4 to 6 carbon atoms represented by the following general formula:

(XIII)

wherein R₄ represents an alkyl group containing from 1 to 3 carbon atoms. Typical esters include vinyl formate, vinyl acetate, vinyl propionate, vinyl butyrate, etc.

The preformed copolymers prepared from the above defined monomers of Formulas I to XIII can be copolymers of any two of these monomers, or any one of these monomers with acrylonitrile or any one of these monomers with a different monoethylenically unsaturated polymerizable monomer containing a —CH=C< group, but preferably a CH₂=C< group. The polymerizations for preparing these copolymers, as well as the homopolymers, can be carried out in the same general manner as described in the preceding to the point where from 70% to substantially 100% of the original monomers present in the polymerization reaction mixture are converted to the preformed polymers. The latter are then either isolated before the graft polymerization step with acrylonitrile or the polymerization reaction mixture is used after polymerization directly as such without separation of the polymer therefrom.

As set forth in the description and examples, acrylonitrile alone or with one or more other monoethylenically unsaturated polymerizable monomers containing a —CH=C< group, but preferably a —CH₂=C< group, are polymerized in the presence of any of the above defined homopolymers other than unsubstituted polyacrylamide and polymethacrylamide and copolymers in the proportions of from 5 to 95 parts by weight of acrylonitrile or acrylonitrile plus at least one other monomer to from 95 to 5 parts by weight of the homopolymer or the copolymer. Advantageously, these polymerizations may also be carried out to the point where from 70% to substantially 100% of the monomers present have been converted to the modified acrylonitrile polymer. Where acrylonitrile and one or more other monomers containing a —CH=C< group are employed together, the proportions are within the limits of from 15.0 to 0.5% by weight of the other monomer or monomers.

The term monoethylenically unsaturated, polymerizable compounds or monomers containing a —CH=C< group as used herein, is intended to include the compounds represented by Formulas I to XIII, in addition to other monomeric compounds coming within the scope thereof such as styrene, α-methylstyrene, p-acetaminostyrene, α-acetoxystyrene, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, methacrylonitrile, N-vinyl phthalimide, vinyl sulfonamide, ethylene, isobutylene, and the like.

A particularly valuable class of compounds which are prepared in accordance with this invention are those employing a vinyl pyridine modifier in conjunction with one of the monomers which have been specifically disclosed in the formulas set out hereinabove. The vinyl pyridines which are suitable for use in practicing this invention include the unsubstituted vinyl pyridines such as 4-vinyl pyridine, 2-vinyl pyridine or the like as well as the substituted vinyl pyridines having one or more alkyl groups in the 2, 4 or 6 positions on the ring. Such substituted pyridines are those having an alkyl group containing from one to four carbon atoms and include 2-methyl-5-vinyl pyridine, 2-vinyl-6-methyl pyridine and the like. The copolymers of these or similar vinly pyridines with an acrylamide or a methacrylamide are particularly suitable for use in polymerizing with either acrylonitrile alone or in combination with a different monomer containing a —CH=C< group. Other suitable copolymers include both the isolated and the nonisolated copolymers of vinyl pyridine as described with any of the other monomers containing a —CH=C< group. These and other vinyl copolymers have excellent dyeing characteristics when used to modify acrylonitrile polymers and the resulting fibers show excellent light fastness when dyed with any of the common textile dyes.

Although the invention has been described in considerable detail with particular reference to certain preferred embodiments thereof, variations and modifications can be effected within the spirit and scope of the invention as described hereinabove and as defined in the appended claims.

What we claim is:

1. A process for preparing a graft copolymer which comprises introducing continuously into a polymerization reactor vessel a graft copolymerization mixture comprising (1) water, (2) from 60 to 95 parts by weight of a monomeric material selected from the group consisting of acrylonitrile and monomer mixtures consisting of from 85.0 to 99.5% by weight of acrylonitrile and from 15.0 to 0.5% by weight of a different monoethylenically unsaturated, polymerizable monomer containing a single —CH=C< group, (3) a peroxide polymerization catalyst and (4) from 40 to 5 parts by weight of a preformed polymer of a compound represented by the following general formula:

wherein R represents a member selected from the group consisting of a hydrogen atom and an alkyl group containing from 1 to 4 carbon atoms, R₁ represents an alkyl group containing from 1–4 carbon atoms and R₃ represents a member selected from the group consisting of a hydrogen atom and a methyl group, heating the said graft copolymerization mixture until from 70% to approximately 100% of the said monomers have been converted to the said graft copolymer, and continuously withdrawing from the reactor vessel polymerized mixture containing the said graft copolymer at about the same rate as unreacted graft copolymerization mixture is introduced into the reactor vessel.

2. The process of claim 1 wherein the said preformed copolymer (3) is introduced continuously into the system in the form of its original aqueous polymerization reaction mixture.

3. The process of claim 1 wherein a polymerization activating agent selected from the group consisting of an alkali-metal sulfite, an alkali-metal bisulfite and an alkali-metal metabisulfite is introduced continuously into the system.

4. The process of claim 1 wherein an alkyl mercaptan chain regulator is continuously introduced into the system.

5. The process of claim 1 wherein phosphoric acid is continuously introduced into the system.

6. A process for preparing a graft copolymer which comprises introducing continuously into a polymerization reaction vessel a graft copolymerization mixture comprising (1) water, (2) from 60 to 95 parts by weight of a monomer mixture consisting of from 85.0 to 99.5% by weight of acrylonitrile and from 15.0 to 0.5% by weight of N-methyl methacrylamide, (3) a peroxide polymerization catalyst and (4) from 40 to 5 parts by weight of a preformed copolymer of acrylonitrile and N-methyl methacrylamide, heating the said graft copolymerization mixture until from 70% to approximately 100% of the said monomers have been converted to the said graft copolymer, and continuously withdrawing from the reactor vessel polymerization mixture containing the said graft copolymer at about the same rate as unreacted graft copolymerization mixture is introduced into the reactor vessel.

7. A process for preparing a graft copolymer which comprises introducing continuously into a polymerization reactor vessel a graft copolymerization reaction mixture comprising (1) water, (2) a monomer mixture consisting of 100 parts by weight of acrylonitrile and 5.6 parts by weight of a 30% solution of N-methyl methacrylamide in water, (3) an alkali-metal persulfate polymerization catalyst and (4) 307 parts by weight of a 10% solution in water of a preformed copolymer consisting of 70% by weight of N-methyl methacrylamide and 30% by weight of acrylonitrile, heating the said graft polymerization mixture until from 70% to approximately 100% of the said monomers have been converted to the said graft copolymer, and continuously withdrawing from the reactor vessel polymerization mixture containing the said graft copolymer at about the same rate as unreacted graft copolymerization mixture is introduced into the reaction vessel.

References Cited in the file of this patent

UNITED STATES PATENTS

| | | |
|---|---|---|
| 2,486,241 | Arnold | Oct. 25, 1949 |
| 2,620,324 | Coover et al. | Dec. 2, 1952 |
| 2,649,434 | Coover et al. | Aug. 18, 1953 |
| 2,657,191 | Coover et al. | Oct. 23, 1953 |

FOREIGN PATENTS

| | | |
|---|---|---|
| 627,265 | Great Britain | Aug. 4, 1949 |
| 679,562 | Great Britain | Sept. 17, 1952 |
| 1,054,343 | France | Oct. 7, 1953 |

OTHER REFERENCES

Jour. Polymer Science, vol. 8, pages 257–277, particularly page 260, 1952.